United States Patent Office 3,190,877
Patented June 22, 1965

3,190,877
CRYSTALLINE SODIUM SALT OF 5′-GUANYLIC ACID AND A METHOD FOR PREPARING THE SAME
Joichi Ishibashi and Kikuo Ito, Hikari, Japan, assignors to Takeda Chemical Industries, Ltd., Osaka, Japan
No Drawing. Filed Feb. 13, 1963, Ser. No. 258,160
Claims priority, application Japan, Feb. 15, 1962, 37/6,137
7 Claims. (Cl. 260—211.5)

This invention relates to crystalline sodium salt of 5′-guanylic acid and to a method for preparing the same. More particularly, the crystalline salt is disodium salt of 5′-guanylic acid and the method comprises allowing a solution of 5′-guanylic acid or of its sodium salt to keep at an alkaline pH until crystalline sodium salt of 5′-guanylic acid is precipitated.

It is known that 5′-guanylic acid or its salts are very effective for enhancing flavour of deliciousness of foodstuff. (Hereinafter, 5′-guanylic acid or its salts are referred to 5′-guanylic acids.) The ability of 5′-guanylic acid to improve and/or enhance the flavor of foodstuffs is strong, and also 5′-guanylic acids are stable against heat and therefore, it is convenient to cook or to store foodstuffs to which 5′-guanylic acid is added. Therefore, 5′-guanylic acids are employed widely in the field of food industry or in cooking.

Generally, 5′-guanylic acid is produced through hydrolysis of nucleic acid or its derivatives or their partial hydrolyzate by means of an enzyme, produced by microorganisms, which can hydrolyze nucleic acid into 5′-nucleotides. The 5′-guanylic acid is then separated by conventional collecting methods for nucleotides such as an ion exchange resin, adsorption or partition chromatography on an adequate adsorbent such as active charcoal, silica gel and cellulose powder, electrophoresis using an ion change resin membrane, etc. The microorganisms are those belonging to Fungi Imperfecti, Eubacteriales, Actinomycetales, Sphaeriales and Pletascales, for instance.

While 5′-guanylic acid is generally obtainable as crystals in the form of its barium salt, the crystalline barium salt of 5′-guanylic acid is not regarded as preferable for the practical application in the field of food industry because of its hard solubility in water.

There have been found no successful means for producing the crystalline sodium salt except in the amorphous state. Sodium salt of 5′-guanylic acid has therefore, a rather unattractive appearance, which detracts from the commercial value of the product in spite of its excellent flavour enhancing property.

Under such circumstances, successful production of crystalline sodium salt of 5′-guanylic acid has been in ardent demand from the field of food industry. For satisfying such demand, the present inventors have made an extensive study on the production of crystalline sodium salt of 5′-guanylic acid.

As a result, they have found a very simple method for converting amorphous sodium salt of 5′-guanylic acid into crystal form. Namely, when sodium hydroxide is added to a solution of 5′-guanylic acid, amorphous sodium salt precipitates at once. The so precipitated sodium salt is kept in the alkaline solution as is, without being taken out of the solution, to eventually yield crystals of sodium salt of 5′-guanylic acid.

An object of this invention lies in obtaining crystalline sodium salt of 5′-guanylic acid. Another object lies in obtaining 5′-guanylic acid having a better appearance. A further object lies in obtaining 5′-guanylic acid which can conveniently be used commercially. These objects are realized by keeping a solution of 5′-guanylic acid or its sodium salt at an alkaline pH until crystalline sodium salt of 5′-guanylic acid is precipitated.

Purity of crystalline sodium salt of 5′-guanylic acid by this invention is higher than 99% (dry base).

Crystalline sodium salt of 5′-guanylic acid of this invention having a very good appearance, can be applied to practical use for enhancing taste or flavour of foodstuff with no difficulty such as soups, sauces, pastes, sausages, canned foods, salads, boiled foods, pickles, alcoholic drinks, vinegars, table salts, breads, fruits juice, fermented foodstuff, etc. In effectiveness seems to be enhanced when its is used together with other chemical condiments such as monosodium glutamate, 5′-inosinic acid or its salts, sodium succinate, 5′-xanthylic acid or its salts, 5′-cytidylic acid or its salts, etc.

Sodium salt of 5′-guanylic acid of this invention shows a well defined X-ray diffraction pattern which indicates that this compound is highly crystalline. There is a little difference in the patterns depending upon the condition of the crystals such as the extent of its dryness. For examples, the lattice spacings of sodium salt of 5′-guanylic acid which is kept at a relative humidity of 50% are as follows:

11.62 angstrom (A.), 7.132 A., 6.988 A. (strong), 4.333 A., 3.966 A., 3.229 A., 3.151 A., 2.378 A. (strong), 2.120 A., 1.864 A.

In an infrared spectrum, the sodium salt of this invention shows distinct absorption bands at 1635 cm.$^{-1}$ and 1400 cm.$^{-1}$, the absorption bands do not appear at 1635 cm.$^{-1}$ and 1400 cm.$^{-1}$ in amorphous sodium salt of 5′-guanylic acid.

The method of this invention is carried out by keeping a solution of 5′-guanylic acid or its sodium salt at any alkaline pH until crystalline sodium salt of 5′-guanylic acid is precipitated. The pH value may not be necessarily high, being preferably about 8.0~9.5 in most cases. While the pH value of the solution is generally adjusted by addition of alkali, when sodium salt of 5′-guanylic acid is employed as the starting material, addition of alkali may not particularly be necessary. As the alkali, there may, for example be used alkali hydroxide such as sodium hydroxide, potassium hydroxide, etc., alkali carbonate such as sodium carbonate, potassium carbonate, etc. However, when free guanylic acid is employed as the starting material of this invention, sodium hydroxide or sodium salt should be used.

Also, when the desired pH value of the solution is obtained by concentrating the solution, the addition of alkali may not be necessary. The method of this invention can be carried out at room temperature or under cooling. However, when heating of the solution to adequate temperature promotes crystallization of 5′-guanylic acid or its amorphous sodium salt, and the time required for the crystallization is greatly shortened by heating, the solution may be heated, so long as the starting material is not decomposed. When the method of this invention is carried out at room temperature, it is necessary in most cases to keep the solution at an alkaline pH for more than 10 hours, more preferably for 12–24 hours. While, the method of this invention is carried out at elevated temperature, for example, about 60° C., by keeping an aqueous solution of sodium salt of 5′-guanylic acid at an alkaline pH, amorphous sodium salt of 5′-guanylic acid becomes crystalline in form in less than 15 minutes. Thus, it is to be understood that time required for the crystallization depends on conditions such as the temperature of the solution, kind of alkali or starting material, etc.

Example 1

To 2200 milliliters of an aqueous solution containing 34 grams of 5'-guanylic acid obtained by separating partial hydrolyzate of nucleic acid through partition chromatography on active charcoal is added 7.6 grams of sodium hydroxide, followed by concentrating to 230 milliliters under reduced pressure. To the resultant solution is added sodium hydroxide to make its pH 9.0, and then 350 milliliters of methanol is added with stirring at 40° C. to precipitate amorphous sodium salt of 5'-guanylic acid, which is kept standing at about 30° C. for 12–24 hours to obtain colorless, pillar crystals of sodium salt of 5'-guanylic acid. Yield 35 grams (84%).

Example 2

To 300 milliliters of an aqueous solution of 38.7 grams of sodium salt of 5'-guanylic acid (pH 8.85) is added 450 milliliters of methanol at room temperature to precipitate amorphous sodium salt. Then the solution containing an amorphous sodium salt of 5'-guanylic acid is heated to about 60° C. to obtain crystalline sodium salt of 5'-guanylic acid in about 10 minutes. The crystals are dried in vacuo. Yield: 89.9%.

Having thus disclosed the invention, what is claimed is:

1. Crystalline disodium salt of 5'-guanylic acid.

2. A method for preparing crystalline disodium salt of 5'-guanylic acid, which comprises dissolving a member selected from the group consisting of 5'-guanylic acid and the sodium salt of 5'-guanylic acid in a solution having an alkaline pH, leaving said member in said solution until amorphous disodium salt of 5'-guanylic acid is precipitated, and leaving said amorphous salt in said solution until crystalline disodium salt of 5'-guanylic acid is formed.

3. A method for preparing crystalline disodium salt of 5'-guanylic acid, which comprises dissolving a member selected from the group consisting of 5'-guanylic acid and sodium salt of 5'-guanylic acid in sodium hydroxide solution and leaving said member in said sodium hydroxide solution for 10–24 hours at room temperature, whereby amorphous disodium salt of 5'-guanylic acid is first precipitated and subsequently crystalline disodium salt of 5'-guanylic acid is formed.

4. A method for preparing crystalline disodium salt of 5'-guanylic acid, which comprises dissolving a member selected from the group consisting of 5'-guanylic acid and sodium salt of 5'-guanylic acid in a sodium hydroxide solution and leaving said member in said sodium hydroxide solution for 15–30 minutes at about 60° C., whereby amorphous disodium salt of 5'-guanylic acid is first precipitated and subsequently crystalline disodium salt of 5'-guanylic acid is formed from said amorphous form.

5. The method claimed in claim 2, wherein the pH value is 8.0–9.5.

6. The method claimed in claim 3, wherein the pH value is 8.0–9.5.

7. The method claimed in claim 4, wherein the pH value is 8.0–9.5.

References Cited by the Examiner

UNITED STATES PATENTS

| | | | |
|---|---|---|---|
| 2,549,827 | 4/51 | Laufer et al. | 260—211.5 |
| 2,653,897 | 9/53 | Harvill | 260—211.5 |

OTHER REFERENCES

Chem. Abst. Subject Index, volume 56, 1962, page 1044.

Merck Index, 7th ed., 1960, page 502, Merck and Co., Inc., Rahway, N.J.

LEWIS GOTTS, *Primary Examiner.*